June 18, 1957 E. I. MONTGOMERY ET AL 2,796,014
DAMP AIR AUTO COOLER
Filed July 6, 1954 2 Sheets-Sheet 1
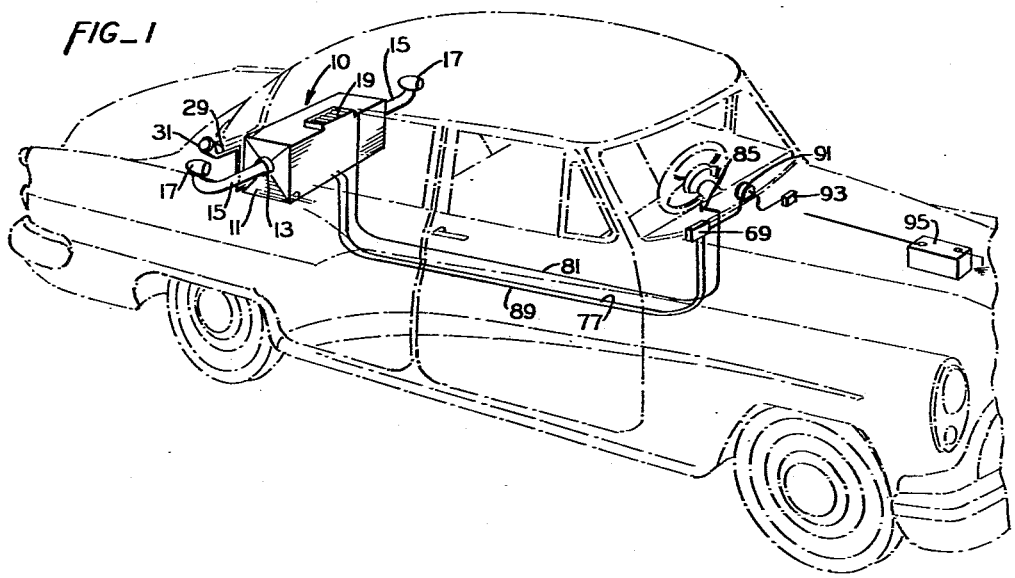
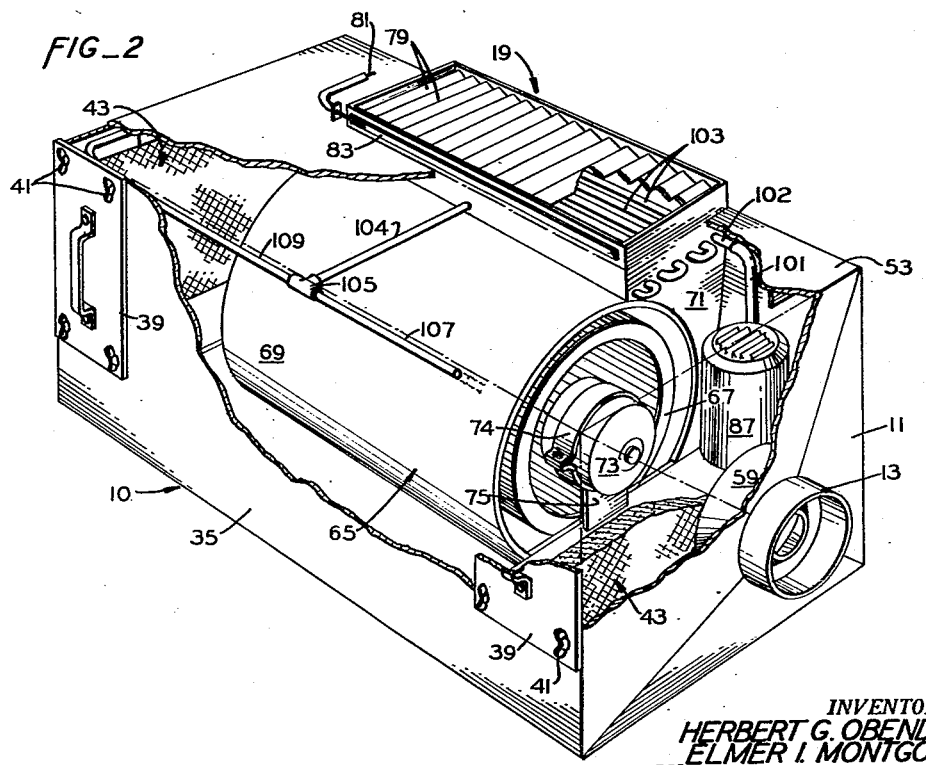
INVENTORS
HERBERT G. OBENDORF
ELMER I. MONTGOMERY
BY
Naylor and Lassagne
ATTORNEYS June 18, 1957 E. I. MONTGOMERY ET AL 2,796,014
DAMP AIR AUTO COOLER
Filed July 6, 1954 2 Sheets-Sheet 2
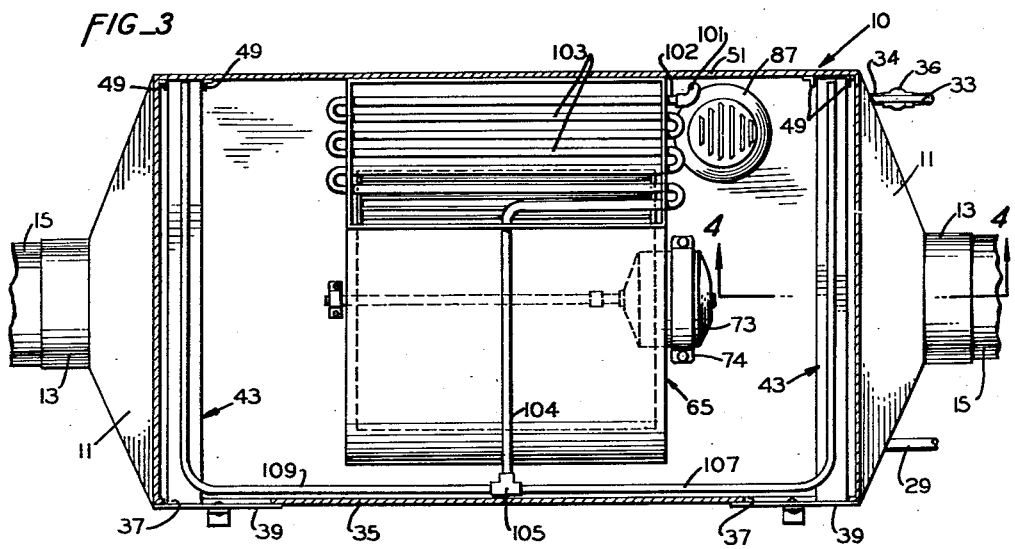
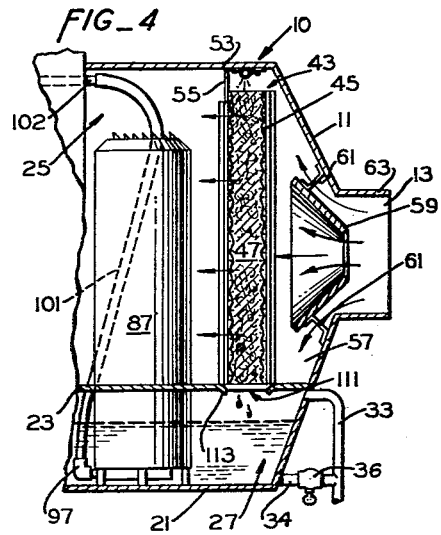
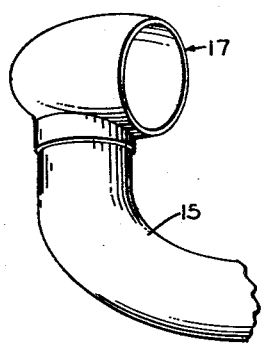
INVENTORS
HERBERT G. OBENDORF
ELMER I. MONTGOMERY
BY
ATTORNEYS

United States Patent Office 2,796,014
Patented June 18, 1957

2,796,014

DAMP AIR AUTO COOLER

Elmer I. Montgomery and Herbert G. Obendorf, Redding, Calif.

Application July 6, 1954, Serial No. 441,424

3 Claims. (Cl. 98—2)

This invention relates generally to evaporative type coolers, and more particularly to air conditioning apparatus of such type which are particularly adapted for installation in automobiles and other vehicles.

A main object of the present invention is to provide an improved air conditioning apparatus of the water evaporative type which is adapted to be readily installed within the trunk compartment of an automobile as to be removed from the heat of the engine, said apparatus being so constructed and arranged that outside air may be forced therethrough either by ram pressure created by forward movement of the automobile or by a power driven blower, to provide flexibility of operation in conditioning or cooling the passenger compartment or interior of the automobile body.

Another object of the invention is to provide an air conditioning apparatus of the above type which is of simple and compact construction as to occupy a minimum of space in the trunk compartment of the automobile, yet having a relatively large cooling capacity to provide the required supply of moist, cool air to the interior of the automobile body under substantially all warm and/or hot weather conditions.

Another object is to provide an air conditioning apparatus having an evaporative surface and filtering area through which the outside air is evenly and uniformly passed, thus providing maximum cooling of the outside air in relation to the overall dimensions of the evaporative filter, as well as greatly extending life and efficiency of the evaporative filter in relation to the filtering characteristics thereof.

Still another object is to provide an air conditioning apparatus in which the water supplied to the evaporative surface area is pre-cooled to the temperature of the cool air discharged from such evaporative surface area.

Generally described, the present invention contemplates the provision of a housing adapted to be installed within the trunk compartment of an automobile, preferably behind the back portion of the rearmost seat and immediately below the usual package deck provided in most standard automobiles of today. The housing has air inlet openings in its ends which are connected by means of suitable ducts to forwardly disposed air scoops provided in the rear fenders or body portion of the automobile, and with an air outlet or discharge opening in its top portion which registers with an opening provided in the package deck. Adjacent to and somewhat spaced from each of the air inlet openings there is a removable vertical transverse partition of absorbent filter material which separates the housing to provide air receiving chambers. In each of these chambers, there is provided a deflector of cone or other suitable shape adapted to deflect the incoming air and to evenly distribute the flow thereof across the entire surface of the absorbent filter material, through which the incoming air must flow in passing to the interior of the automobile through the outlet opening of the housing. Means are provided for continuously supplying water to the top of the absorbent filter material in order to maintain the same in a saturated condition for moistening and cooling the air flowing therethrough. In accordance with an important feature of the invention, such means preferably comprise a pump which forces water from a reservoir located in the bottom of the housing through a conduit system which extends in part in zig-zag arrangement across the air outlet opening of the housing serving thus to cool the water flowing therethrough to the temperature cool air discharged, and then by means of separate conduits to the top of each of the absorbent filters where the water is then sprayed or otherwise discharged on such absorbent filters to maintain the same at all times in a saturated condition. A power driven blower is provided which is mounted within the housing between the absorbent filters whereby the outside air may be forced through the housing either by ram pressure created by the air scoops with forward movement of the automobile or, as conditions demand, by selective operation of the blower. To provide for convenient operation of the air conditioning apparatus by the driver, means are provided for selectively operating from the dash of the automobile both the power driven blower and the water pump, as well as air discharge control louvers provided in the outlet opening of housing adapted to close said outlet opening when the apparatus is not in use.

The above as well as other objects and features of the present invention will be more readily apparent from the following description of the accompanying drawings wherein the novel form, combination and arrangement of parts are illustrated in accordance with a preferred embodiment of the invention; in which drawings:

Figure 1 is a perspective view of a standard automobile, showing the same equipped with an air conditioning apparatus constructed in accordance with the present invention, the apparatus being shown in perspective;

Figure 2 is a top perspective view, partly in section, of the apparatus housing and contained parts;

Figure 3 is a top plan view of the apparatus shown in Figure 2, with the top of the housing removed;

Figure 4 is a side view in elevation taken along line 4—4 of Figure 3; and

Figure 5 is a perspective view of the air scoop shown in Figure 1.

Referring now to the drawings, and generally to Figure 1, it will be observed that the air conditioning apparatus according to the present invention is installed in the forward portion of the trunk compartment of an automobile of conventional construction. The rectangular housing 10 of the apparatus is longitudinally disposed across such compartment and may be secured in any suitable manner, as by brackets extending to the trunk deck or otherwise, which rigidly position the housing behind the back portion of the rear seat immediately below the conventional package deck. The end portions 11 of the housing are provided with inlet openings 13 which are connected by means of conduits 15 to the air scoops 17 which for convenience of installation, are mounted on and extend inwardly through the automobile trunk body adjacent to and longitudinally spaced from the inlet openings 13. The top of the housing 10 has a flanged discharge opening 19, preferably of rectangular shape, which registers with and extends slightly through an opening provided in the package deck of the automobile behind the rear seat.

As shown in Figure 4, spaced above the bottom 21 of the housing 10 is a horizontal partition wall or false bottom 23 which separates the housing into upper and lower compartments 25 and 27 respectively. The lower compartment 27 serves as a water reservoir which preferably is capable of storing 3 to 4 gallons of water, normally required for a day's operation under extreme conditions of warm weather temperatures. For convenience in filling the water reservoir, one end of a tube 29 is connected to an end portion 11 of the housing just below the partition 23, the other end of the tube extending through the body portion of the trunk in close proximity to the adjacent air scoop 17, see Figure 1, and provided with a suitable external cap or closure 31. An overflow pipe 33 and a drain pipe 34 having a valve 36 connected therein are also provided in the manner shown such that water flowing through either of such pipes will gravitate through the pipe 33 which is of sufficient length to pass through the bottom of the trunk compartment.

Side wall 35 of the housing is provided with vertically disposed rectangular openings 37, located adjacent the end portions, see Figures 2 and 3, which openings are covered by cover 39 removably secured to the wall 35 by means of the wing nuts 41. Carried by each of the covers 39 is an air moistening and filtering unit, generally designated as 43, preferably comprising a pair of spaced apart screens 45 which are adapted to receive and carry therebetween a removable filter-evaporator pad 47, formed of any suitable material capable of filtering the air and retaining moisture, as for example excelsior, aspen-fiber pads, or the like. When the cover 39 is secured to the wall 35 in the manner described, the end of the unit 43 opposite the cover will be engaged between the brackets 49 secured to the opposite side wall 51, with the bottom of the unit flush with the partition 23 and top of the unit spaced slightly below the top wall 53 with its inner vertical edge portion flush with the lower edge portion of the downwardly extending baffle 55 carried by the top wall 53.

By means of the above arrangement, it will be observed that the units 43 when inserted, constitute porous transverse vertical partitions through which the incoming air must flow, and separate the upper compartment 25 of the housing 10 to provide with the outwardly tapered end portions 11 air receiving chambers 57 in which are disposed deflectors 59. These deflectors are preferably in the form of open mouth cones which are secured by means of brackets 61 in spaced relation to the inner tapered wall of the end portion 11, extending into the inlet opening 13 as defined by the annular flange 63, whereby the flow of incoming air will be evenly distributed across the face of the filter-evaporator unit 43.

As shown in Figures 2 and 3, within the housing 10 between the units 43 there is a blower 65, here shown as a centrifugal fan of the squirrel cage type having a rotary impeller 67, an outer casing 69 and an outlet or air discharge duct 71. The impeller 67 is driven by means of an electric motor 73, preferably of the two-speed type which is supported by the strap 74 and bracket 75 extending upwardly from the horizontal partition 23, and is connected by wiring 77 to the switch box 69', see Figure 1. The casing 69 is mounted and supported in a rectangular opening provided in the horizontal partition 23 such that the discharge duct 71 will extend in an upward direction through a rectangular opening provided in the top 53 with its top edge portion forming in relation therewith a flanged opening or air discharge, generally designated hereinbefore as 19, which registers with the rectangular opening in the package deck.

Within the flanged opening there are pivotally fitted a plurality of horizontal transversely extending louvers 79 which are rotatable about their longitudinal axis between opened and closed positions. For the purpose of operating such louvers from the driver's position, there is provided a flexible push-pull type control linkage 81 of well known type which is connected at one end to the longitudinally movable actuating member 83 slidably mounted on one side of the flanged opening 19, and at the other end to an operating member 85 mounted on the dashboard. Movement of the actuating member 83 in a longitudinal direction effects a rotational movement of the louvers 79 as by means of a rack and gear arrangement or by means of other suitable construction of well known types.

For the purpose of moistening the water absorbent material of the units 43, there is provided a water pump 87 which is mounted on the bottom 21 of the housing, extending as shown, see Figures 3 and 4, upwardly through an opening provided in the horizontal partition wall 23. The pump may be of any well known type driven by a self-contained electric motor which is connected by wiring 89, see Figure 1, to the switch box 69 mounted on or beneath the dash board of the automobile, which is in turn connected in the usual manner through the ammeter 91 and voltage regulator 93 to the battery 95. The outlet 97 of the pump is connected to flexible tubing 101 which extends upwardly from the base of the pump and is connected at its upper end to the end 102 of tubing 103. The tubing 103 extends in zig-zag pattern through the longitudinal ends of the air discharge duct 71 below the louvers 79 with its outer end portion 104 being bent to extend forwardly through a lateral wall of the duct in a horizontal direction. The tubing 103 is preferably made of a material having a high heat conductivity, as for example thin walled copper tubing, for the purpose of cooling the water flowing through the same to the temperature of the air discharged through the air discharge duct 71, such air having been previously cooled as will be described hereinafter.

The end of the tubing 104 is connected by means of the T-fitting 105 to horizontally disposed branch tubes 107 and 109 which extend outwardly, see Figures 2 and 3, towards the respective ends 11 of the housing where they are bent inwardly in a transverse direction to the housing so as to be positioned above the upper edge of the respective absorbent filter units 43. The branch tubes 107 and 109 are secured to the housing top 53 in a suitable manner as by means of brackets, not shown, and are provided with a plurality of small perforations or apertures, see Figure 4, whereby the water pumped through the tubes 107 and 109 will be sprayed on the top of the absorbent filter units 43 to maintain the material thereof in a moist condition. The horizontal partition immediately below the units 43 is provided with a rectangular opening 111 having downwardly flared longitudinal edge portions 113 whereby excess water drained from the units 43 will be returned to the water reservoir compartment 27 and recirculated in the manner described above.

From the foregoing description of the invention, it is believed that the operation of the apparatus will be readily apparent. As installed according to the foregoing description in the forward portion of the trunk compartment, the apparatus is removed from the heat of the engine, yet readily operable by the driver to obtain proper cooling of the passenger compartment through the selective operation from the dash of the controls 69' and 85. When the louvers 79 are opened and the switch to the pump 87 closed, water from the reservoir 27 will be forced through the tubing 101 and 103 to the branch tubing 107 and 109 and sprayed on the absorbent filter units 43. When the automobile is traveling at normal open road speeds, say of approximately 40 to 50 miles per hour, ram pressure created by the outside air on the air scoops 17 forces fresh air through the air ducts 15 into the air receiving chambers 57. The flow of such incoming air is evenly distributed by the deflectors 59 across the face of the absorbent filter units 43 such that during travel of the air through the moistened units 43, the air will be filtered by the material thereof and at the same time cooled due to a considerable amount of evaporation which takes place. As such cool air is then forced out of the housing through air discharge duct 19 and into the interior or passenger compartment of the automobile, it in turn cools the water flowing through the zig-zag tubing 103.

Should the delivery of cool air to the interior of the automobile be inadequate to properly condition the passenger compartment as desired, as for example when traveling at relatively low speeds, or in open country in unusually warm weather, it is only necessary for the driver to selectively close the switch to the blower 65 to either of the two speeds provided to force an adequate supply of outside air through the apparatus and into the passenger compartment.

By means of such selective controls, the locating of the apparatus in the trunk compartment away from the heat of the engine, and the evaporative effect produced by the even distribution of the flow of incoming air through the evaporative filter units 43 which are moistened with water pre-cooled to the temperature of the cool air entering the passenger compartment, it has been found that the interior of an automobile of today's conventional construction can be properly conditioned with fresh cool air under substantially all warm weather conditions.

While the present invention has been illustrated and described according to a preferred embodiment and construction, providing a simple and efficient apparatus for the intended purposes, it will be apparent to those skilled in the art that many variations in construction and arrangement of parts are possible without departing from the inventive concept.

What is claimed is:

1. An air conditioner of the water evaporative type for automobiles comprising a housing adapted to be mounted in the automobile trunk compartment, a horizontal partition in said housing arranged to divide the interior thereof into upper and lower compartments, said lower compartment forming a reservoir adapted to hold a quantity of water, air inlet openings formed in respective opposite end portions of said housing, said openings communicating with said upper compartment of the housing, ram air scoops mounted exteriorly of the automobile body on either side thereof, air conduits connecting said ram air scoops with said air inlet openings, a power driven blower mounted in said housing with its air inlet disposed in said upper housing compartment and having an air discharge duct extending through an opening formed in the top of said housing, said discharge duct being adapted to register with an opening provided communicating from the trunk compartment with the passenger compartment, absorbent filter units removably disposed in transverse vertical position within said upper compartment of the housing adjacent to said air inlet openings, through which all of the incoming air must pass as it travels through the housing, deflector means mounted in said upper compartment in the areas between each of said absorbent filter units and said air inlet openings, adapted to evenly distribute the flow of incoming air across the face of the respective absorbent filter units, a power driven pump mounted in said housing with its inlet open to the interior of said lower compartment adjacent the bottom thereof, conduit means connected to the pump outlet and so arranged that portions of said conduit means are positioned adjacent to the top edges of said absorbent filter units, spaced apertures in said portions of said conduit means directed to deliver water directly onto the top edges of said absorbent filter units, and means operable from the driver's position for selectively controlling the operation of the power driven blower, the power driven water pump, and the flow of air through the housing caused by forward movement of the automobile, respectively.

2. An air conditioner of the water evaporative type for automobiles comprising a housing adapted to be mounted in the automobile trunk compartment, a horizontal partition in said housing arranged to divide the interior thereof into upper and lower compartments, said lower compartment forming a reservoir adapted to hold a quantity of water, air inlet openings formed in respective opposite end portions of said housing, said openings communicating with said upper compartment of the housing, ram air scoops mounted exteriorly of the automobile body on either side thereof, air conduits connecting said ram air scoops with said air inlet openings, a power driven blower mounted in said housing with its air inlet disposed in said upper housing compartment and having an air discharge duct extending through an opening formed in the top of said housing, said discharge duct being adapted to register with an opening provided communicating from the trunk compartment with the passenger compartment, absorbent filter units removably disposed in transverse vertical position within said upper compartment of the housing adjacent to said air inlet openings, through which all of the incoming air must pass as it travels through the housing, deflector means mounted in said upper compartment in the areas between each of said absorbent filter units and said air inlet openings, adapted to evenly distribute the flow of incoming air across the face of the respective absorbent filter units, a power driven pump mounted in said housing with its inlet open to the interior of said lower compartment adjacent the bottom thereof, a conduit connected to the pump outlet and so arranged that a portion thereof is positioned in zig-zag pattern in a plane across the interior of the air discharge duct, a pair of conduits connected at their ends to the discharge end of said portion of conduit arranged in zig-zag pattern, and extending to a point wherein a portion of said pair of conduits are positioned adjacent to and beneath the top of said housing immediately above the top edges of said absorbent filter units, spaced apertures in said portions of said pair of conduits directed to deliver water directly onto the top edges of said absorbent filter units, and means operable from the driver's position for selectively controlling the operation of the power driven blower, the power driven water pump, and the flow of air through the housing caused by forward movement of the automobile, respectively.

3. In an air conditioner for automobiles of the type described, the combination comprising a housing including an air inlet and an air outlet adapted to discharge conditioned air into the interior of the passenger compartment, an absorbent filter unit disposed within said housing adjacent to said inlet opening, through which all of the incoming air must pass as it travels through the housing, open-mouth cone-shaped deflector means mounted in said housing in the area between said absorbent filter unit and said air inlet opening, adapted to evenly distribute the flow of incoming air across the whole of the face of the absorbent filter unit, a water reservoir associated with said housing, a pump mounted in said housing with its inlet in communication with said water reservoir immediately above the bottom thereof, conduit means connected to the pump outlet and so arranged that a portion thereof is positioned adjacent to and beneath the top of said housing immediately above the top edge of said absorbent filter unit, and spaced apertures in said portion of conduit directed to deliver water directly onto the top edge of said absorbent filter unit.

References Cited in the file of this patent

UNITED STATES PATENTS

| | | |
|---|---|---|
| 2,170,991 | Grady | Aug. 29, 1939 |
| 2,183,136 | Downs | Dec. 12, 1939 |
| 2,237,497 | Munford | Apr. 8, 1941 |
| 2,285,725 | Kneedler | June 9, 1942 |
| 2,294,036 | Kettering | Aug. 25, 1942 |
| 2,655,349 | Beavin | Oct. 13, 1953 |
| 2,685,434 | Underwood | Aug. 3, 1954 |